UNITED STATES PATENT OFFICE.

GARDNER HOWLAND, OF BRUNSWICK, NEW YORK.

IMPROVEMENT IN RECOVERING WASTE ALKALIES.

Specification forming part of Letters Patent No. 39,653, dated August 25, 1863.

*To all whom it may concern:*

Be it known that I, GARDNER HOWLAND, of the town of Brunswick, in the county of Rensselaer and State of New York, have invented a new and useful improvement in the re-employment of alkalies upon vegetable fiber; and I do declare that the following is a full and exact description of my mode of employing the said alkalies.

My improvement consists in the reclaiming and reuse of spent alkalies, so that they may be reused repeatedly.

In the manufacture of paper from straw, wood, and other crude fiber large quantities of alkalies are used and then thrown away into the streams, to the great detriment of the waters of such streams. By my invention these alkalies are saved and may be used again and again.

After the alkalies have been spent upon straw, wood, or other like fibers throw them into a vat or receiver, and while hot or being heated, or even when cold, add to them a quantity of hydrate of lime. Stir this mass together until the alkalies and hydrate or milk of lime are thoroughly intermingled. Then leave the mixture thus formed partially or wholly to cool, and the residuum will be precipitated, leaving a supernatant alkaline liquid, which may be again employed upon a new batch of fibers or material containing fiber.

The quantity of lime may be varied according to the nature of the spent liquid to be treated, which may very readily be ascertained by practice upon the liquid to be reclaimed. The heating may be accomplished either by steam or fire, as is most convenient. The supernatant liquid thus obtained may be used alone or in connection with fresh alkalies, that may be added to produce the strength necessary to accomplish the desired result upon the fiber. The residuum thus precipitated may, if desired, be burned in an ordinary reverberatory furnace and the alkali remaining therein reclaimed and used as fresh alkali.

What I claim as my invention, and desire to secure by Letters Patent, is—

The use of the supernatant alkaline liquor resulting from the treatment of alkaline lyes with lime after such lyes have been used in the reduction of crude vegetable fiber.

GARDNER HOWLAND.

Witnesses:
CHARLES L. ALDEN,
S. A. ROBINSON.